MAGNETIC APPARATUS AND METHODS

Filed Dec. 7, 1956

4 Sheets-Sheet 1

INVENTORS
SIDNEY M. RUBENS
THOMAS D. ROSSING

BY Cushman, Darby & Cushman
ATTORNEYS

MAGNETIC APPARATUS AND METHODS

Filed Dec. 7, 1956

4 Sheets-Sheet 2

INVENTORS

SIDNEY M. RUBENS
THOMAS D. ROSSING

BY

Cushman, Darby & Cushman

ATTORNEYS

INVENTORS
SIDNEY M. RUBENS
THOMAS D. ROSSING
BY Cushman, Darby & Cushman
ATTORNEYS MAGNETIC APPARATUS AND METHODS
Filed Dec. 7, 1956
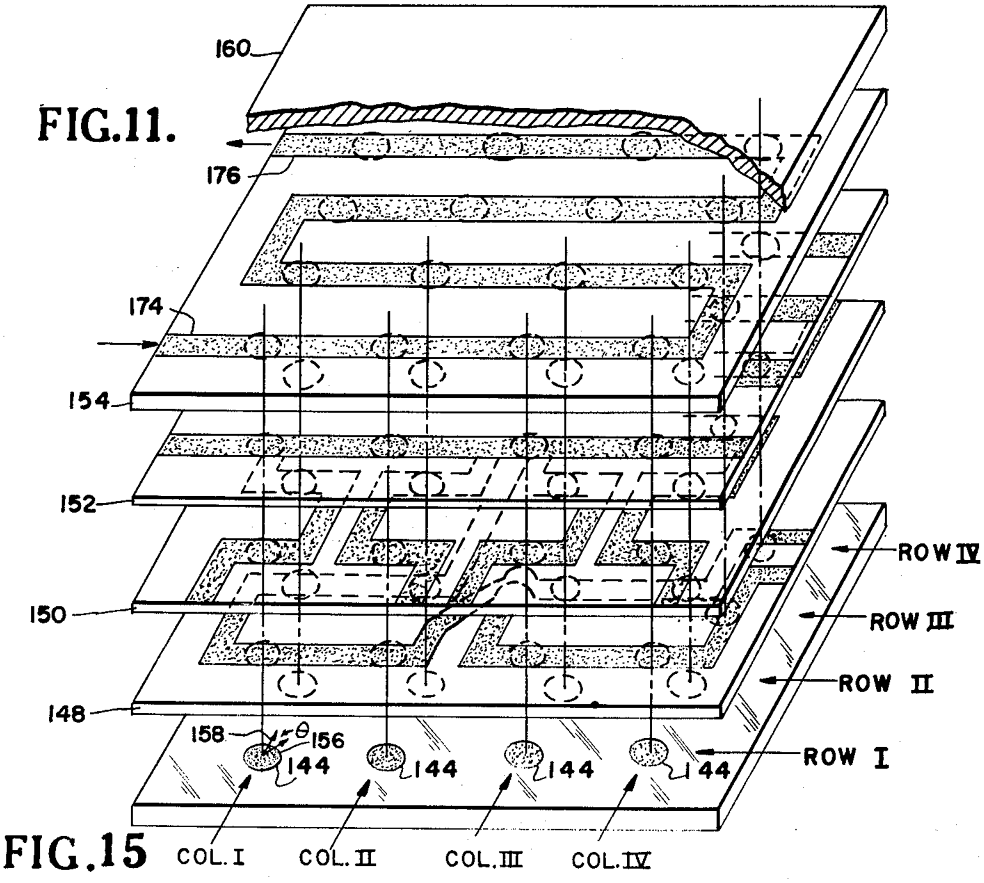
FIG.11. FIG.15
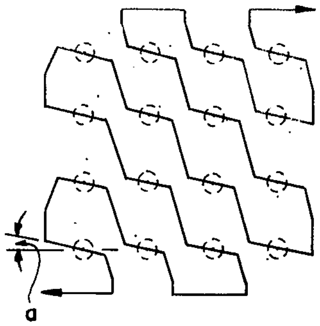
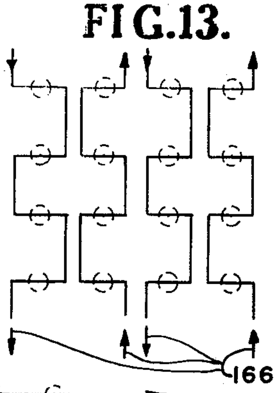
FIG.13.
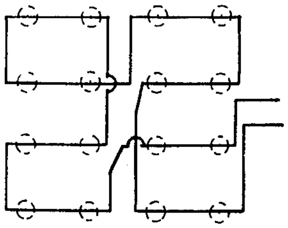
FIG.12.
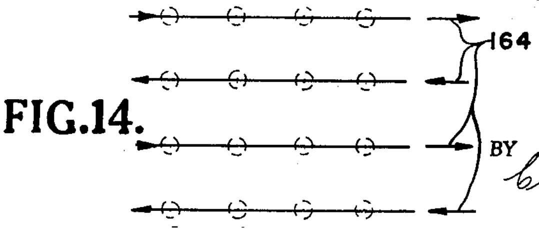
FIG.14.
INVENTORS
SIDNEY M. RUBENS
THOMAS D. ROSSING
BY Cushman, Darby & Cushman
ATTORNEYS United States Patent Office 3,030,612
Patented Apr. 17, 1962

3,030,612

MAGNETIC APPARATUS AND METHODS

Sidney M. Rubens, St. Paul, and Thomas D. Rossing, Northfield, Minn., assignors to Sperry Rand Corporation, New York, N.Y., a corporation of Delaware Filed Dec. 7, 1956, Ser. No. 626,945
4 Claims. (Cl. 340—174)

This invention relates to methods and apparatus for switching magnetic material having square loop type hysteresis characteristics. The invention further relates to magnetic devices preferably but not necessarily utilizing the aforesaid switching methods and apparatus. The invention additionally relates to coincident current magnetic memory apparatus, again preferably but not necessarily utilizing the aforesaid switching techniques.

The knowledge of the art prior to the respective features of the present invention has been to switch a piece or core of square loop type magnetic material between its opposite states of remanent magnetization by application thereto simply of a magnetic field in one direction to drive into a first state of remanent magnetization, and a field in the reverse direction to drive into the opposite state of remanent magnetization. In accordance with the first feature of the present invention, it has been discovered that a main switching field component could be accompanied by a second switching field component at an angle to the first. Such combination of switching field components is found to greatly increase the speed of switching, particularly for cores in the form of very thin films or layers of magnetic material. This rapid switching, apparently based upon a domain rotation principle, is also found to exist under the principles of the instant feature of the invention by taking particular advantage of any axis of easy magnetization of the core. That is, where the core is characterized by having at least one axis of easy magnetization, it has been discovered that increased switching speed results from applying a switching field at an angle to said axis of easy magnetization.

Additionally, it has been discovered that exteremely compact magnetic devices, and coincident current magnetic memory apparatus, can be constructed by building up layers of electrical conductors and interposed electrical insulators, in proximity to a thin layer of magnetic material forming the magnetic core or cores, respectively. As will become apparent herein, such "sandwich" magnetic devices and coincident current memory apparatus do not require the switching techniques hereinabove briefly reviewed, but nevertheless optimum results are obtained in these sandwich devices by utilizing same, and therefore all of the respective inventive features are set forth in this application.

Accordingly, it is one important object of the invention to provide methods and apparatus for rapidly switching magnetic cores of magnetic material having square loop hysteresis characteristics.

It is a further object of the invention to provide compact magnetic devices in the form of a thin piece of magnetic material sandwiched with layers of conductive material and interposed electrical insulators.

It is a further object of the invention to provide coincident current magnetic memory apparatus formed by a layer having areas of thin magnetic material thereon, ard additional layers sandwiched therewith of electrical conductors passing in predetermined order adjacent to the respective pieces of magnetic material, and insulating layers interposed between the conductive layers to prevent short-circuiting therebetween.

Further objects and the entire scope of the invention will become more fully apparent from the following description and from the appended claims.

Illustrative embodiments of apparatus embodying the inventive features, can be best understood with reference to the accompanying drawings, wherein:

FIGURE 11 illustrates one plane of a magnetic memory and windings all in the form of a sandwich;

FIGURE 12 illustrates a configuration of the sense winding;

FIGURE 13 illustrates a configuration of the vertical drive line;

FIGURE 14 illustrates a configuration of a horizontal drive line, and

FIGURE 15 illustrates another configuration of a sense winding.

The first inventive feature, relating to methods and apparatus for rapidly switching magnetic materials of the square hysteresis loop type, will now be described. Heretofore, it has ben the practice of the art to provide a closed loop of the magnetic material (e.g., a toroidal core) and apply a main switching field to it in one direction to place the material in a first state of remanent magnetization. Then, to place the material in its opposite state, a magnetic field in the reverse direction has been applied. In accordance with the instant discovery, it has been found that if a piece or core of magnetic material having square loop characteristics has applied thereto not only a main switching field component, but another field component at an angle thereto, the speed of switching is increased.

The piece of core or magnetic material may be conventional bulk material, or bulk material rolled into thin ribbon as is conventional in the art, or can be a condensation product in accordance with copending application of Rubens, Serial No. 599,100, filed July 20, 1956, now Patent No. 2,900,282. That application describes the formation of very thin layers of magnetic material by deposition of material by condensation methods under high vacuum, in the presence of an orienting magnetic field. Magnetic materials made according to that application have many desirable characteristics, among them a zero magnetrostrictive property along an axis of easy magnetization resulting in extremely square hysteresis loop characteristics. Inasmuch as optimum results are obtained by using deposition of films according to said application in the present discovery, this description proceeds mainly with reference to such layers of magnetic material. However, it should be understood that other materials as outlined above are also useful, and no limitation is necessary or intended.

Figure 1:
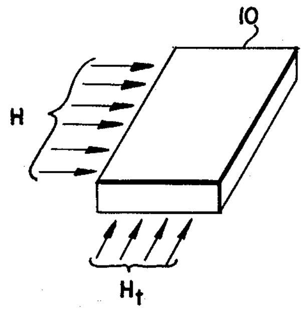
FIGURE 1 illustrates a volume of square loop type magnetic material being subjected to magnetic fields angulated to each other.

To fully illustrate the instant discovery, let it be understood that in FIGURE 1, reference character 10 shows a volume of square loop type magnetic material. For the general case, volume 10 can be considered to be part of a conventional core, or may itself be a complete core. This application hereinafter describes how a thin layer of magnetic material preferably a condensation product in accordance with the above Rubens application, can serve as a core without requirement for windings threading the core.

In FIGURE 1 vectors H represent a conventional switching field applied to volume 10 of magnetic material, which for convenience can be termed a core. The application of field H in the direction shown will create a first state of remanent magnetization in core 10. A field in exactly the reverse direction to H, would shift the remanent magnetization, all according to known practice. However, the instant discovery is that a transverse field represented by vectors $H_T$ should be applied concurrently with H, in either direction of application of H. Additionally, the field $H_T$ can be reversed. As will become apparent hereinafter, the same domain rotational advantages accrue.

Figure 2:
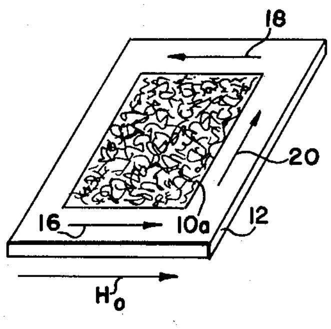
FIGURE 2 is a perspective view of a deposited magnetic element upon a dielectric substrate being subjected to longitudinal and transverse fields.

If the core 10 has an axis of easy magnetization this axis should be oriented in relation to the applied H and $H_T$ fields to obtain optimum results. It has been above indicated that condensation deposition type materials are preferred in the practice of the instant invention. Additionally, these layers when deposited in the presence of an orienting magnetic field, have an axis of easy magnetization aligned with the orienting field. Therefore, analysis of the instant discovery as applied to very thin condensation layers, and to ones having a predetermined axis of easy magnetization, will be discussed in connection with FIGURE 2. In this figure, reference character **10*a* represents a deposition film, which has been deposited in the presence of an orienting magnetic field $H_O$, the film or layer 10*a* formed on a smooth substrate 12, for example, smooth glass. The axis of easy magnetization will be parallel to vector 16, and parallel to $H_O$. To obtain optimum switching speeds, the main switching field component, corresponding to H in FIGURE 1, is to be applied parallel to vector 18, i.e., in a direction longitudinal in respect to vectors 16 and $H_O$, and is consequently hereinafter termed the longitudinal field $H_L$. The transverse field component, corresponding to $H_T$ in FIGURE 1, should be applied parallel to vector 20. As will be made fully apparent hereinafter, these fields can be most conveniently created by passing a ribbon-like conductor in close proximity to the core 10*a*, thereby creating field components substantially in the plane of the core 10*a*. As explained hereinafter, the core 10*a* exhibits square loop properties in its substantially flat form, without having to close on itself. Therefore, as is further developed later in this application, a magnetic device having one core 10*a* may be constructed by having layers of conductors and interposed insulators, to form a "sandwich." Additionally, small areas of a large substrate may have positioned thereon at spaced apart points a plurality of cores such as 10*a***. By building up a sandwich, a complete coincident current memory or other device using a multiplicity of cores can be conveniently constructed. Additionally, it will be explained hereinbelow, that a circular configuration (plan view) of the core is preferred.

Figure 3:
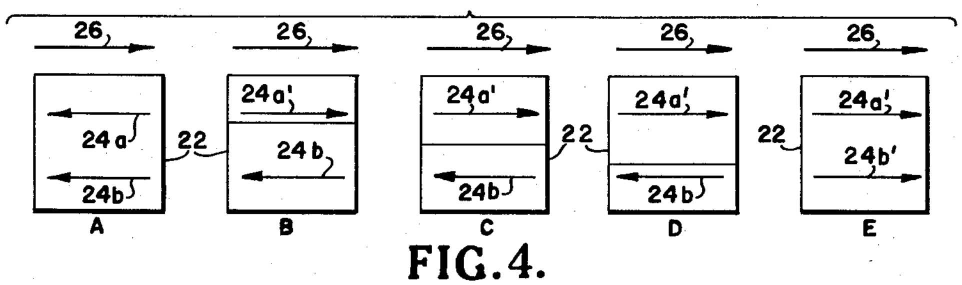
FIGURE 3 is a diagrammatic representation of the process of wall migration in magnetic materials.
Figure 4:
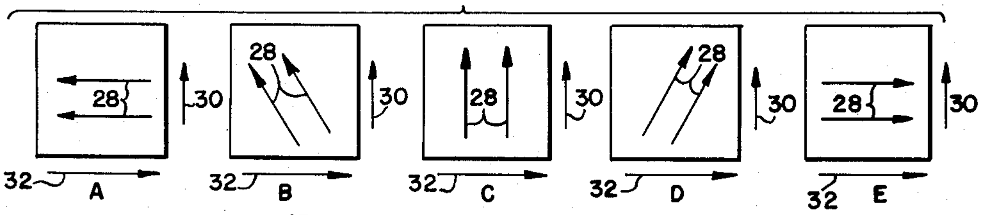
FIGURE 4 is a diagrammatic representation of the rotaitonal process for single-domain dynamics.

A comparison between switching without a transverse field component $H_T$ and switching with such a transverse field component according to the instant discovery, is made with reference to FIGURES 3 and 4, respectively.

First, by way of explanation, the novel functioning of the present inventive feature is believed to be based upon a process of remagnetization referred to as simple domain rotation. This is apparently governed by single-domain dynamics. This action is entirely different from that found to exist in previous magnetic devices in utilizing the transverse field aspect of the instant discovery. In those cases, a reverse in the state of magnetization involves so called 180° wall motion. To continue this explanation, FIGURE 3 shows in diagrammatic form the steps in the wall motion process of remagnetization. Magnetic film 22 is a thin rolled foil such as ⅛ mil 4–79 molybdenum Permalloy with the saturated remanent magnetization represented by two vectors **24*a* and 24*b*. The conventional switching field represented by vector 26 is disposed substantially 180° with respect to the remanent magnetization. No transverse field component is present. As shown in steps A through E of FIGURE 3, the remagnetization of the foil under the influence of the switching field proceeds in an orderly fashion, as is well known, from one side of the foil to the other. Thus, the domains of discrete magnetically oriented areas are progressively reversed 180° and complete magnetization in the opposite direction is effected only when the totality of individual domains have each yielded to the influence of the switching field to form in step E a remanent state as indicated by vectors 24*a'* and 24*b'***. It is in essence a wall migration process.

FIGURE 4 explains the domain rotational process of remagnetization which appears to be in existence when use is made of both main switching and transverse switching field components. In this process it is believed that the entire magnetization of the film as indicated by vectors 28 is reversed by continuous simple rotation as is shown in the progressive stages A through E in FIGURE 4, the sudden rotation being induced by the application of a transverse field component indicated by vector 30 and a main or longitudinal switching field component referenced by vector 32. The concurrent application of both these field components produces rotation of the magnetization of the domain by applying, in effect, a torque action thereto, causing domain rotation throughout the reversal process, the torque diminishing substantially to zero at the point of complete remagnetization. Thus, the combined effect of both the transverse and longitudinal fields is to switch the state of the film rapidly from one remanent magnetic state to its opposite state.

Figure 5:
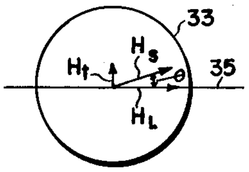
FIGURE 5 is an illustration of switching a circular magnetic element by applying a single field at an angle to the easy axis of magnetization.

FIGURE 5 illustrates a circular configuration of a thin magnetic element for use in this invention, this being the preferred configuration. However, any multi-sided figure may be used. A circular configuration is preferable because shape anisotropy effects which might occur during remagnetization by the rotation process are substantially eliminated. In addition, FIGURE 5 illustrates the preferred method of obtaining the transverse field when the magnetic element 33 exhibits an easy axis of magnetization 35. By applying a single switching field $H_S$ at an angle $\theta$ with the easy axis 35, the element will be switched by the rotation process since switching field $H_S$ has orthogonal components $H_L$ and $H_T$, the former of which lies along the easy axis 35 and the latter of which is transverse thereto. Since remanent magnetization is in one direction or the other along easy axis 35, the longitudinal and transverse components of the switching field $H_S$ when applied in the appropriate direction at a desired angle $\theta$ will reverse the remanent magnetization. It is apparent, therefore, that by appropriate selection of angle $\theta$, the desired relative magnitudes of the transverse and longitudinal field components may be provided so that switching can be accomplished in a predetermined time.

Figures 6, 7:
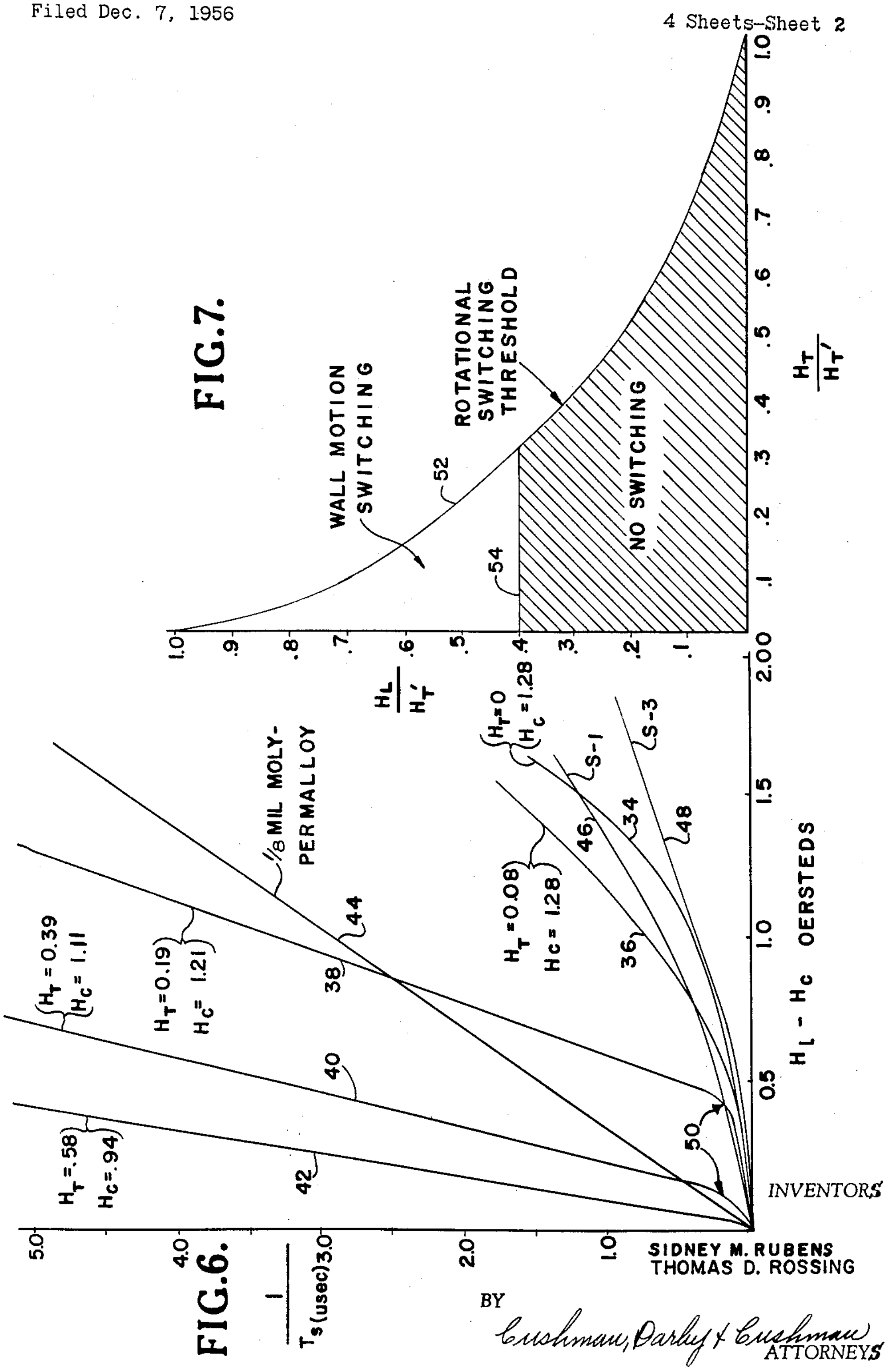
FIGURE 6 is a graph showing the difference between the switching times for cores switched in accordance with this invention as compared to prior art switching.
FIGURE 7 is a graph illustrating the rotational process threshold.

FIGURE 6 illustrates a family of switching curves 34, 36, 38, 40 and 42 with various cross fields $H_T$ and different coercive forces $H_C$, both as stated in the drawings, for a circular sample of vacuum deposited non-magnetostrictive Permalloy one centimeter in diameter and about 2000 A. (Angstrom units) thick. These curves are to be compared with curve 44 for ⅛ mil Permalloy and curves 46 and 48 for magnesium-manganese type ferrite cores of commercial designation S1 and S3, respectively, the latter being of lower coercivity. Switching time here is defined as the period between the time the drive field reaches the coercive force and the time at which the output voltage has dropped to 10 percent of its peak value. The curves are actually a plot of the reciprocal of the switching time in microseconds versus the effective longitudinal field $H_e$ which is the difference between the applied longitudinal field $H_L$ and the coercive force $H_C$ in oersteds. Curves 34 through 42 attest to the fact that the greater the transverse field $H_T$, the faster the switching time as long as the coercive force $H_C$ remains substantially constant, which is deemed to exist in FIGURE 6 at least for comparative purposes. It should be observed that the slopes of the switching curves 38, 40 and 42 for the evaporated materials under the transverse and coercive field conditions stated therefor, are four to eight times greater than curve 44 for ⅛ mil molybdenum Permalloy and fifteen to twenty times greater than the slope of curves 46 and 48 for ferrite materials. For drive fields whose magnitude corresponds to points below the break or knee 50 of the switching curves of FIGURE 6, switching occurs primarily by wall motion. Beyond the knee or threshold 50 switching occurs by means of the fast simple rotation process.

The threshold of the rotational switching process can be predicted with reasonable accuracy on the basis of a simple energy model assuming that the potential energy associated with the magnetization varies as $\sin^2 \theta$, $\theta$ being the angle between the total magnetization (acting as a simple dipole) and the easy direction of magnetization. FIGURE 7 illustrates the threshold field conditions predicted by the model, and those conditions are in satisfactory agreement with experimental measurements. $H_T'$ is defined as the magnitude of cross field necessary to produce saturation in the transverse (hard) direction. $H_L$ is defined as the magnitude of the longitudinal switching field, and $H_T$ is defined as the magnitude of the transverse or cross switching field used during the switching process. To the right of curve 52, switching is accomplished by the rotational process, while to the left of curve 52 and above line 54 switching is by the wall motion process, there being no switching for values in the cross hatch area below curve 52 and line 54. As the transverse field $H_T$ is increased, the longitudinal field $H_L$ necessary to cause rotational switching diminishes. In a film with negligible magnetostriction, the coercivity for magnetization by wall motion is less than that for rotation. Therefore, for longitudinal fields less than that necessary to produce rotation, the material switches by wall motion; and for a given transverse field with the longitudinal field above the rotational threshold, switching occurs by the much more rapid rotational process giving rise to the knee 50 (FIGURE 6) and a transverse pick up voltage. Because of the good agreement between the values predicted by the model and those experimentally measured, the model can be used as an analytic tool for designing effective memories and the like.

As indicated in FIGURE 6 by curves 40 and 42, an evaporated film of 2000 A. thickness and one centimeter in diameter with a coercive force $H_C$ of approximately one oersted is capable of being coincident current switched by longitudinal and transverse field components not only in as little time as 0.2 microsecond with an effective longitudinal field $H_e(=H_L-H_C)$ of approximately 0.4 to 0.7 oersted when a suitable transverse field is applied, but also (by extension of curves 40 and 42) in one-half that time, i.e., 0.1 microsecond, with an approximate effective longitudinal field $H_e$ of only 0.8 to 1.3 oersteds, and in even less time by a greater field. The one centimeter sample on which these measurements were made is much larger than need be to obtain such switching times and is also much larger than an appropriate size to include in a memory. For a 2000 A. thick film, it is found that the diameter of the films can be reduced to the neighborhood of 0.35 to 0.4 centimeter before the film properties become seriously affected. If the diameter of a film is decreased beyond this, the demagnetization fields arising from free poles at the edges of the films cause the hysteresis loops to shear and the switching times to be considerably increased. The increase in switching time apparently results from areas of reverse magnetization created by the demagnetizing fields which impede the simple rotation process. The size of the memory element can be reduced further if some method is used to diminish the demagnetizing field. This can be accomplished, for example, with a suitable high permeability backing material for completing the magnetic-flux path associated with the film elements, for example, in a manner hereinafter described with reference to FIGURE 11.

As hereinabove indicated, a second general aspect of the present invention is the discovery that a complete magnetic device can be constructed by making a sandwich of a layer of square loop type magnetic material and adjacent layers of conductors and interposed insulators. As will become fully apparent herein, it is not required in such a magnetic device that the magnetic material be a condensation-deposition material, but such material is preferred and, therefore, this explanation will proceed with reference thereto, but without limitation.

It has been found most advantageous to utilize so-called "printed circuits" for fabricating the electrical conductors, but again, no limitation thereto is necessary. The term "printed circuit" as used herein is intended to include all conducting arrays fabricated by such methods as etching, evaporating, painting, etc., which are well known in the art.

As will become fully apparent hereinbelow, many of the principles pertaining to a sandwich magnetic device utilizing only one core can be applied to a coincident current memory system. Several features common to single core as well as multiple core apparatus will first be described, with reference to FIGURE 8.

One of the major fabrication problems in any device which employs one or more toroidal cores is the stringing of wires through the individual toriods. The instant inventive feature makes possible the use of multilayer printed circuits in place of the difficult stringing technique. For example, thin flat foil-conductors or ribbons may be used for the sense, drive, and inhibit leads and windings of coincident current memories. The fields along the surface of the conductors are fairly uniform, and the core elements are placed in close proximity with the conductors.

Figure 8:
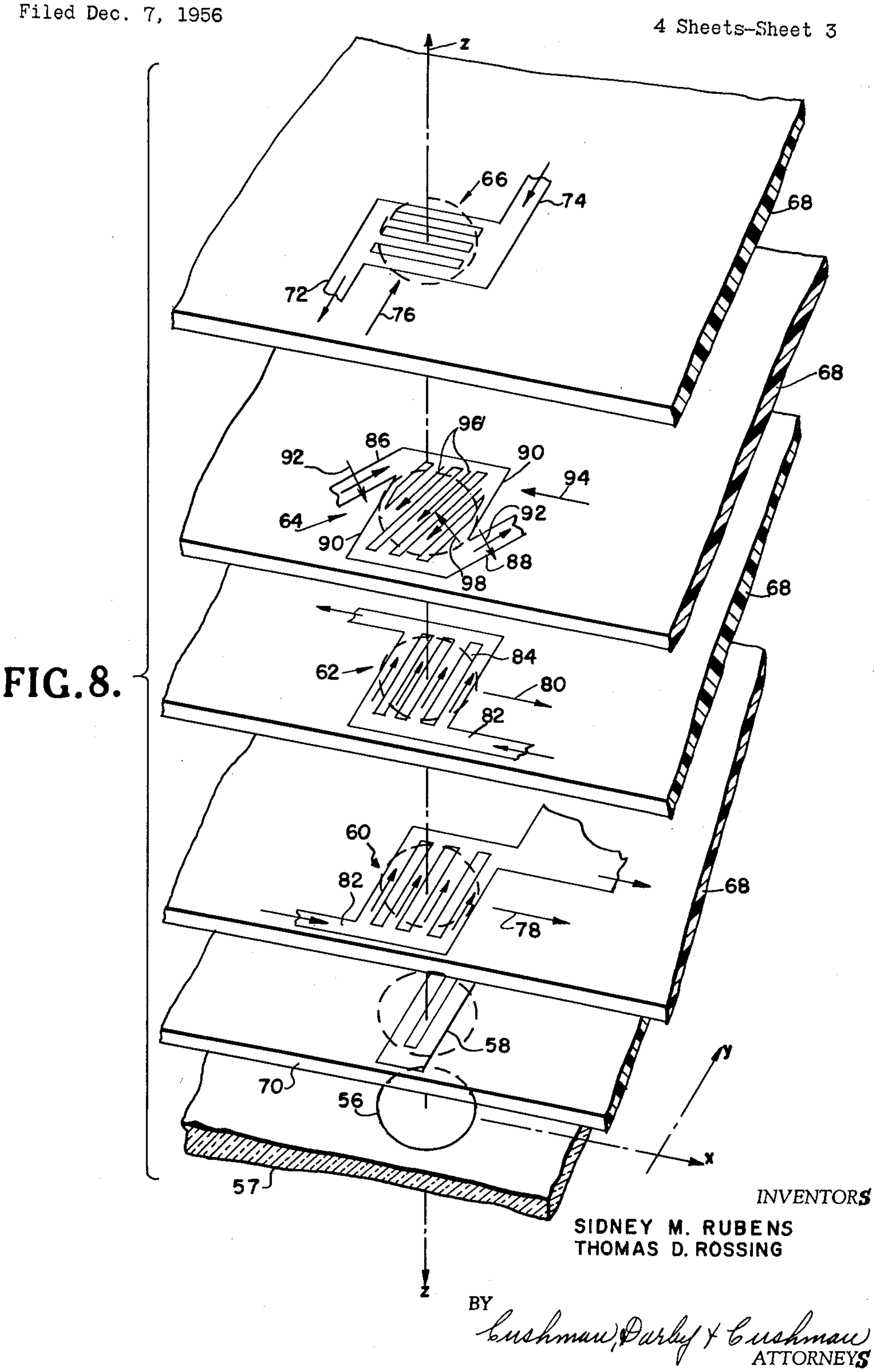
FIGURE 8 is an embodiment illustrating several features of this invention.

FIGURE 8 shows an exploded view of a sandwich comprising magnetic material according to the instant inventive feature. This can be considered a "bit" or cell position of a memory unit, or alternatively, can be thought of as a view of a single unit for use as an amplifier, switch, gate or the like. The magnetic element 56 can be any suitable material, but is preferably a deposited type. It is disposed on a substrate 57 such as glass, and windings 58, 60, 62, 64 and 66 with their leads are laid successively in surfaces substantially parallel with the surface of the magnetic film 56. It is to be noted that each winding is a flat portion of a conductor, which conductor has leads, preferably flat also, for carrying current into and away from the flat portion respectively. Although the area of the flat portions is shown rectangular, no limitation thereto is intended. As will be noted, the approximate center of each winding area lies along the $z$ axis which runs perpendicular to, and from the center of, circular film 56. The $x$ and $y$ axes of film 56 extend at right angles to each other and to the $z$ axis as shown.

It should be understood that while the magnetic elements and printed circuits are herein illustrated as entirely flat and lying within plane surfaces, the surfaces can, in fact, be curved. The main point of the present disclosure, is that a sandwich type device can be constructed even if all of the layers of the sandwich be somewhat curved or other than planar. Either form of construction is entirely different from the prior art concept of requiring that the magnetic material close upon itself, and requiring that conductors be threaded through the closed loop of magnetic material.

In the general case, the ribbon-like windings which carry electric current, if there are more than two of them, must be separated by an interposed insulating layer to prevent short-circuiting. It is preferable, although apparently not necessary, to electrically insulate between the magnetic material 56 and the most proximate winding 58. Suitable interposed insulation can be realized in several ways. For example, each of the windings as shown in FIGURE 8 can be etched or otherwise "printed" directly onto backing material of an insulating nature. Instead, if the windings are separate foil members, it is simply required that separate insulating members be provided. If desired, there may be a printed circuit on both sides of a given board, such as windings 58 and 60 on the respective sides of the lowermost insulating panel 68 in FIGURE 8. Additional interposing layers would be used as desired. It should be understood that there is no particular limitation in this application to any particular technique for arriving at a sandwich of magnetic material and a plurality of conductors, with suitable interposed insulation.

As will become more fully apparent hereinbelow, in FIGURE 8 the particular layout of windings 58, 60, 62, 64 and 66 is for use in a coincident current memory. However, for the general case, where the element 56 may be serving any type of magnetic device, the point being made here is that with such a sandwich arrangement, electrical current passing through any one of the windings is capable of controlling the state of magnetization of the element 56. The control may be the complete reversal of the state of remanent magnetization, or some lesser degree of change of the magnetization. It may be desirable, as in a coincident current memory, to rely upon a predetermined combination of currents in two or more of the windings, to effect a desired control. Conversely, changes in the state of magnetization of the element 56 will have an inductive effect in one or more of the windings. For example, where the sandwich of FIGURE 8 is, in fact, one position of a coincident current memory, it is intended that some combination of currents through windings 60, 62, 64 and 66 can reverse the state of remanent magnetization of the element 56. Also, there is sufficient inductive coupling between element 56 and at least winding 58, to make sensing of changes in the magnetization of element 56 possible. In either case, this is based upon the inducing of a voltage in winding 58 whenever element 56 undergoes a change in its state of magnetization. It will be immediately apparent to those skilled in the art that the windings 58, 60, 62, 64 and 66, or a lesser or greater number, can be analogous to the conventional windings on toroidal cores in magnetic devices such as the amplifiers, gates, etc., mentioned above.

As hereinabove stated, a third general aspect of the present invention is the construction of a coincident current magnetic memory. Such coincident current memory apparatus will now be described, inasmuch as such can utilize at each bit storage position, the principles of FIGURE 8. Again, it should be understood that the magnetic elements at each position are preferably formed by the condensation technique. However, a thin layer of magnetic material formed by any other technique is usable and is included within the scope of the discovery. As the description of the coincident current apparatus proceeds, certain features will be described which clearly also apply to a sandwich where used as an amplifier, gate, etc.

Continuing to refer to FIGURE 8, now with coincident current memory apparatus particularly in mind, winding 58 is intended as a sense winding, and lies closest to the magnetic element 56 to provide a maximum coupling effect and is preferably held out of electrical contact with element 56 by a layer of insulation 70 which may be similar to layers 68 which separate the other windings. Following the sense winding is the first drive line winding 60 (which for convenience may be termed a "horizontal" winding), the "vertical" drive line winding 62, an inhibit winding 64, and the transverse field winding 66. As is well known, conventional horizontal and vertical windings with current therethrough provide the half fields which, in coincident current memories, add to provide a drive or longitudinal switching field unless current is present in the inhibit winding. In accordance with the first discussed feature of this invention, as hereinbefore mentioned, a transverse field may be applied to the magnetic element to cause faster switching. Winding 66 with its input leads 72 and 74 provides a field in the $y$ direction as indicated by arrow 76 when current flows through lead 74 and out through lead 72. With a transverse field 76 acting along with the longitudinal half fields 78 and 80 produced respectively by the horizontal and vertical windings 60 and 62 when current enters them through their respective leads 82, the state of magnetic element 56 shifts by the rotational process. However, if current flows through the inhibit winding 64 so as to effectively cancel one of the fields 78, 80, the state of the magnetic element will not be shifted.

With reference to FIGURE 8, it is to be understood that coincident current switching of element 56 can be accomplished by use of only one of the horizontal and vertical windings 60, 62, without the other, along with the transverse winding 66 if the current through the one horizontal or vertical winding used is sufficient by itself to provide the longitudinal switching field component.

Each of the windings may be slit along their length one or more times in the manner indicated by reference character 84. This prevents eddy current which otherwise would damp the rotational switching. The leads to the flat rectangular areas of each winding are preferably disposed at right angles thereto so that the magnetic field produced by current through the leads does not adversely affect the magnetic element. However, it may be necessary at times to make the leads enter the flat rectangular area at an acute or obtuse angle thereto such as illustrated for the inhibit winding 64. It must be understood, however, that this angulation may be involved with any of the other windings, and the inhibit winding 64 is only selected to illustrate this feature. Leads 86 and 88 of the inhibit winding are not perpendicular to the sides 90 of winding area 64. Therefore, the leads, when current enters the area via lead 86, will produce a flux in the direction of arrows 92. Since the function of the inhibit winding is to counteract the fluxes produced by one of the drive windings, the necessary direction of the total flux produced by inhibit winding 64 is that shown by arrow 94. To obtain such a resultant flux when the leads produce a field, the current through the rectangular area of winding 64 must be in the direction of arrows 96 so that the thereby produced flux 98 which when added to flux 92 will produce a field in the direction of vector 94.

Figure 9:
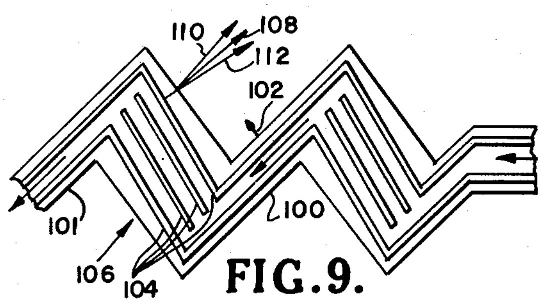
FIGURE 9 illustrates a winding made in accordance with one feature of this invention.

The area of a winding requiring angulation of the leads may be shaped in the manner illustrated in FIGURE 9, if desired. In FIGURE 9, current entering through lead 100 and exiting via lead 101 will produce a flux as indicated by vector 102. If slits 104 were perpendicular to lead 100, current through the winding area 106 would produce a flux vector 108 which when added to flux 102 woud provide a field in accordance with vector 110. However, assuming the desired direction of field to be as indicated by arrow 108, it becomes necessary to slant slits 104 relative to lead 100. The current in the winding area 106 will then produce a flux along vector 112 which when added to flux 102, will give the desired field in the direction of vector 108. As may be noted, not only is the winding area 106 provided with slits, but the leads thereto may also be slit so as to reduce eddy currents therein.

The propagation time down the full length of a drive line for a 24 plane memory system, wherein each plane has a length of line about 10 inches long on each side thereof to form approximately 40 feet of line, has been computed to be 0.12 microsecond with an attenuation of 7 percent. By breaking or splitting the drive lines into two halves, the attenuation may be kept to 3.5 percent while propagation time has diminished to 0.07 microsecond. By analyzing the drive current pulse into its frequency components and checking the delay and attenuation for each component, it was found that very little distortion of pulse shape occurred. To provide the necessary field (about one oersted) per drive line, drive currents of about 400 milliamperes are necessary.

With reference again to FIGURE 8, it will be apparent that transverse winding 66 may actually be continuously biased or may be provided with coincident current pulses to provide triple order coincident selection. Of course, additional windings for either the transverse or longitudinal field may be utilized for higher order coincident selection.

One advantage of the use of a transverse field drive in addition to the two drive lines providing the longitudinal field for switching, is that for a large memory, the total number of drive elements can thereby be reduced. For example, with a plane comprised of $n^2$ elements one then has $2n$ drive lines; if $n^2$ is 1024, $2n=64$. However, if substantially the same number of elements is arrayed in three dimensions, and an additional set of drive lines is introduced, there is an array of $m^3=1024$ elements operated with $3m$ driving elements (tubes or transistors, etc.). Since $$\sqrt[3]{1024} \text{ is } 10+$$

only about $3\times 10+$ or 33 drivers are required to provide complete selection instead of 64 drivers without the third lines. It will be apparent that the windings of any one of the sets of coincident current drive lines can be positioned to establish a transverse field in accordance with this disclosure. In operation, if the transverse field is present in an element along with the two other coincident fields, the element will be switched; if the transverse field is absent, the element will not be switched. It follows that even in a two dimensional (single plane) memory, one of the two coincident fields may be a transverse one with the same results.

It is further possible to provide two coincident current drivers for each of the transverse field components thus providing four drive lines for each element. In such case, $$\sqrt[4]{1024}$$

would be about 6 for each coordinate and the total number of driving elements would then be $4\times 6$ or 24, thereby yielding a considerable saving in driving elements.

As hereinbefore mentioned, the magnetic element 56 in FIGURE 8 is preferably of the type produced by the condensation-deposition method of said Rubens application. Such films when of single domain thickness ranging between 1000 to 4000 A., more or less and preferably between 1500 and 2500 A., have coercivity factors which are not undesirable in relation to the magnetic properties of the films. Optimum composition films comprising approximately 82.75 percent nickel and the remainder iron, have zero magnetostrictive properties along the easy axis of magnetization, and are the type most preferable for use with this invention.

As an example of a practical embodiment of a sandwich type device, similar to that illustrated in FIGURE 8, the following may be considered. The windings and their leads may be made of "one ounce" copper which has a thickness of approximately 1 mil. However, copper one-half mil thick may also be used. The insulation layers 68 and 70 may be of any suitable type which can be cemented to the printed circuits, such as rubber based phenolic resin type or Mylar, and may be in the order of 4 mils thick. Using a magnetic film of thickness in the order of 2000 A., along with five windings each 1 mil thick, disposed all on one side of the magnetic film with each of five interposed layers of insulation 4 mils thick, the furthermost winding as well as the ones in between, when traversed by approximately 400 milliamperes of current, will provide a sufficient field to properly effect the magnetization of the magnetic element. It is to be understood that the foregoing example is merely for illustrative purposes, there being no limitation thereto intended.

Figure 10:
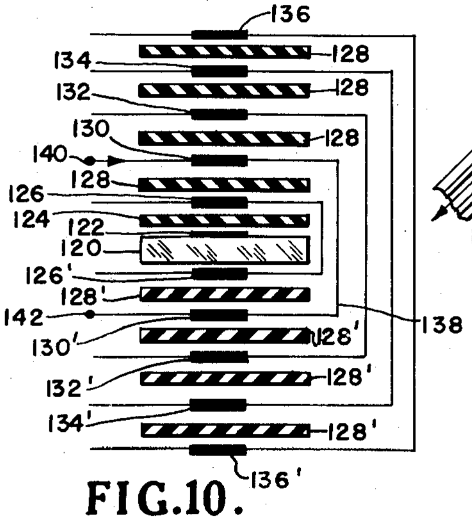
FIGURE 10 illustrates the placement of windings on either side of a magnetic element with serial inter-connection between like windings.

FIGURE 10 illustrates the effect of current through a single drive line upon placing windings both on top and on the bottom of the substrate 120 on which a magnetic film 122 rests, thereby minimizing the drive current amplitude requirements and the inducance of the drive line. As in FIGURE 8, insulation layer 124 separates the sense winding 126 and its leads from the magnetic element 122, while insulation layers 128 respectively separate the remaining windings and their leads. The windings may be stacked in the same succession as in FIGURE 8 with winding 130 being the horizontal winding, winding 132 the vertical winding, winding 134 the inhibit winding and winding 136 the transverse winding; however, no limitation is intended by such an arrangement of windings. Below the substrate 120, similar windings and layers of insulation, indicated respectively with the same numerals followed by a prime mark, may be disposed, there being no need for a layer of insulation between sense winding 126′ and substrate 120. Each layer of windings above the substrate is connected in series externally with the corresponding layer beneath the substrate to form so called thin loops. That is, for example, the layer containing horizontal winding 130 is connected by a conductor 138 to a lower horizontal winding 130′. Such connection is advantageous in that a predetermined amount of current through an upper winding doubles its effect because it also passes through a lower winding. For example, current entering winding 130 from terminal 140 will produce a first magnetic field in a given direction, while the same current as it proceeds through the lower horizontal winding 130′ for exit at terminal 142 produces a second magnetic field which is in a direction so as to be additive to said first magnetic field, the same current thereby producing a 2H or double field as to said magnetic element. It will be apparent that the same is true as to the other upper and lower interconnected windings, and it is to be understood that such an arrangement may be employed for a single magnetic element or for a plurality of such elements as in a memory array.

Although this application illustrates the placing of one set of windings all on one side of the magnetic elements, it will be apparent from the foregoing that part of a set of windings could be on one side while the remainder is on the other. For example, without limitation intended, the sense, vertical and horizontal windings could be placed above the magnetic elements while the inhibit and transverse windings are disposed below. In this manner better inductive effect may be obtained.

As an example of a memory matrix formed in accordance with this invention, FIGURE 11 illustrates a simple and direct method of providing a cross field when selection is determined by the coincidence of currents on two drive line windings. FIGURE 11 shows a preferred embodiment of the present invention as applied to a typical $4\times 4$ memory array, such array including 16 thin magnetic elements 144 arranged four in row I, four in row II, four in row III and four in row IV, as well as four in each of columns I through IV, all the elements having been deposited or otherwise located on a suitable substrate 146 at spaced apart positions as indicated. It is to be understood that FIGURE 11, like FIGURES 8 and 10, illustrates a sandwich in an exploded view, whereas normally the adjacent layers would be in physical contact with each other. Immediately disposed above the magnetic elements 144 is an insulating layer 148 which may be of material similar to insulator 70 of FIGURE 8. On top of the insulator 148 is a printed circuit which is preferably a sense winding whose configuration may be best seen in FIGURE 12, with the dotted circles therein representing elemental areas respectively located in positions corresponding to those of the magnetic elements 144 underneath the sense winding. Insulation layers 150, 152 and 154 separate adjacent windings and the material, and thickness of each layer may be similar to insulator 68 in FIGURE 8. Between insulation layers 150 and 152 there is disposed a plane of printed circuitry which may be of a configuration such as that shown in FIGURE 13, forming a "vertical" winding whereby a first "half" field may be formed. A second "half," additive to the first, is created by the printed circuitry ("horizontal" winding) disposed between insulation layers 152 154, and which circuitry is further shown in schematic detail in FIGURE 14, while the inhibit printed circuitry is above layer 154.

In the embodiment of FIGURE 11, it will be noted that there is no winding for producing the transverse field component. However, such a field component is present because each of the magnetic elements 144 and its easy axis of magnetization, as represented by line 156 for the lower left element, is rotated a predetermined degree (angle $\theta$) as respects the total magnetic field, represented by vector 158, produced by currents through the horizontal and vertical windings in the direction of arrows 164 and 166 in FIGURES 13 and 14. That is, the cross field is provided by orienting the easy magnetization axis of each element at a small angle $\theta$ with respect to the total drive field therefor, thereby allowing the drive field component which is orthogonal to the easy axis of the film to be used as a cross field, all as explained previously in reference to FIGURE 5.

In FIGURE 11, there is shown an additional layer 160 in broken away form, above the inhibit winding. This "backing" layer is any material, such as Hipersil, which has a suitable high degree of permeability and is for the purpose of completing the magnetic flux path associated with the magnetic elements 144. With respect to any one of the magnetic elements 144, layer 160 is of substantially infinite dimension in a plane parallel with the surface of such elements. Since layer 160 acts as a return path for flux, it may serve not only to allow a decrease in the size of the magnetic elements by diminishing the demagnetizing field thereof as hereinbefore mentioned, but also to cause the inductive effects in a sandwich type device to be more prominent for a given set of currents. It is to be noted that such a backing layer may be used only when the windings are disposed on one side, i.e., above or below, a magnetic element, since when windings are placed on both sides of the magnetic element, backing layers would defeat the purposes intended to be served thereby.

With reference again to FIGURE 11, and in particular to the printed circuitry between insulation layers 152 and 154 (also shown in FIGURE 14), hereinbefore referred to as the printed circuitry for the horizontal drive line windings, it will be noted that the conductive portions of the printed circuit comprise a straight line conductor for each of the rows of elements, the dotted circles in FIGURE 14 being representative of elemental areas in the different conductors, which areas correspond respectively to the magnetic elements 144 as they appear underneath the horizontal drive lines. To produce a horizontal field, current may be caused to flow in the different rows of horizontal drive lines, in either direction or in opposite directions for adjacent rows as illustrated in FIGURE 14 by arrows 164.

Since it is necessary to have the currents in the same direction in associated horizontal and vertical rows, the vertical drive line conductors should have a configuration such that current through the conducting portion thereof which is above the magnetic elements in the given row (i.e., at least that portion which is through the elemental areas indicated by the dotted circles which correspond in relative position respectively to the magnetic elements 144), is in the same direction as the current in the horizontal drive line which is above said given row. Coincident current selection can be obtained by interconnecting the conductive portions to form the configuration shown in FIGURE 13 for the vertical drive lines and applying currents in a horizontal and vertical drive line in the directions indicated by arrows 166 and 164 (FIGURE 13) for the selected drive line conductors. By such interconnection, current in adjacent conducting portions for a given column of elemental areas represented by the dotted circles are in opposite directions and consequently produce opposing magnetic fields so as not to adversely affect each other. Therefore, when one of the magnetic elements 144 is to be selected, a coincident current pulse in the printed circuitry horizontal drive lines along with a concurrent pulse in the vertical drive line associated with the magnetic element to be selected, will produce additive half fields which when added together provide a total drive field whereby the desired longitudinal and transverse components thereof cause fast switching of the selected magnetic element.

The configuration of the inhibit drive line may be such that current therethrough will produce a field which will oppose a portion of the total drive field, such as the half field produced by the horizontal or vertical drive lines. In FIGURE 11, the inhibit drive line is a printed circuit which is above insulation layer 154, and is a series of interconnected straight line conductors lying over the respective rows of magnetic elements 144, the dotted circles associated with the inhibit drive line being elemental areas representative of the positions of the magnetic elements 144 directly beneath. With current entering at the left end of the inhibit line 174 superposed on row I, and exiting at the left end of the line 176 superposed on row IV, the field produced effectively cancels a predetermined portion of the total drive field when such is desired, in accordance with conventional operation of inhibit windings in memory arrays.

As in FIGURE 8, the sense winding is located nearest the magnetic elements. The configuration thereof may be as shown in FIGURE 12 so as to have induced therein a voltage when any one of the magnetic elements 144 changes its magnetic state.

The cross-overs of the printed circuit conductors in FIGURE 12 may be made in any conventional fashion. For example, the conductor of one line may be made continuous while that for the crossing over line may be broken so as to approach but not touch the continuous conductor on either side. Then, a thin piece of dielectric may be placed over the continuous conductor at the cross-over point so that a strip of copper may be laid thereover and soldered to the ends of the broken conductor. Alternatively, the cross-over may be made by passing one of the conductors through to and back from the underneath side of the insulation upon which the printed circuit is normally disposed.

When a magnetic film 144 is selected by proper currents in both drive lines, undesirable changes in flux linkage between the unselected but disturbed magnetic elements (those subjected to a field due to a pulse in only one drive line) in the sense winding of a plane occurs even though the hysteresis loop of a suitably deposited film is exceedingly rectangular. This occurs because the field generated by the current in a single drive line causes a small rotation of the magnetization in disturbed elements even though such field is not large enough to cause the magnetization of such a core element to switch. However, by reorienting the path of the sense winding in the immediate vicinity of the core elements by a slight angle relative to the drive field, it is possible to cancel the noise signals arising from the above mentioned flux linkages completely, irrespective of the digit-distribution stored in the memory. This is achieved by orienting the path of the sense winding so the noise arising from a stored "1" is exactly equal to that for a stored "0." If the sense winding is made to have a configuration such as that shown in FIGURE 15, whereby it links successive elements along a given drive line column or row with alternate polarity, exact noise cancellation is possible. The correct angle $\alpha$ (FIGURE 15) between the sense winding and the drive field can be directly computed by employing the simple domain rotational model referred to above, or by performing measurements of the noise for a given array and then redesigning the sense line to minimize the noise.

It is to be understood relative to the different layers of conductors illustrated in FIGURES 11 through 15, that the winding areas thereof, i.e., generally, the elemental areas denoted by dotted circles, may take the form of any of the winding areas illustrated in FIGURE 8, and additionally, may contain slits as shown in FIGURES 8 and 9. The slope of the slits in the winding areas may be as necessary to cause the total developed magnetic field resulting from current through the winding areas in the leads to be in the direction desired, all in accordance with the discussion thereof relative to FIGURES 8 and 9. Also, the leads to and from the winding areas as well as that portion thereof which interconnects the winding areas may be slotted as illustrated in FIGURE 9.

When a 0.4 centimeter diameter core element is switched in 0.5 microsecond, a signal of about 4 millivolts is induced in a sense winding which has a characteristic impedance of about 20 ohms. The total voltage integral arising from the switching of a core element amounts to 1 millivolt-microsecond or a flux linkage of about 0.1 line. From this, it can be appreciated that the signal induced in the sense winding by an unselected but disturbed core element in the manner above referred to is small but may give rise to some noise signals, and for a practical memory, it is desirable to obtain adequate signal-to-noise ratios. However, since adequate signal-to-noise ratios have been demonstrated by physical measurement in a matrix employing only wall motion switching, and since rotational switching gives rise to even larger signal-to-noise ratios, adequate ratios are easily obtained by this invention. By direct computation, it can be shown that by this invention adequate signal-to-noise ratios of at least 10 to 1 are obtainable.

It has been found that the lateral variation of the various windings in the printed circuits can be kept in registration to within three or four mils and that the separation of layers can be kept uniform within a mil or two. If a random two mil variation in separation or five mil lateral displacement occurs between the drive lines and the sense winding, at an element position, a net unbalanced linked air flux of about 0.003 line occurs. When an element is selected by the coincidence of currents in a 32×32 array, the 62 unselected element positions along the two drive lines, (31 along each of the drive lines) which are assumed to have random error variation in their positioning, give on the average an unbalanced mutual coupling signal would occur only during the rise and fall of the current pulses and would have only one fourth the voltage integral of the switch signal. By strobing or gating the output signal so as to eliminate the rise and fall periods, good signal-to-noise ratios (at least 10 to 1) are obtained.

Another possible source of noise arises from the capacitive coupling between a selected drive line and the sense winding. By taking into account the coupling capacity, the drive voltage, the characteristic impedance of the sense winding and the phase delay, it can be computed that a noise pulse equivalent to linking 0.04 line of flux occurs. This again is considerably smaller than that which arises from switching a core element, and adequate signal-to-noise ratios are obtained by strobing.

A further possible source of noise arises from the capacity to ground of the primary winding on the transformer which matches the impedance of a sense amplifier to that of the sense line. By balancing the capacity to a grounded shield, the noise from this source is reduced by a factor of 10 to 100 below the noise arising from the unbalanced air mutual. Thus, as was experimentally indicated, the total signal-to-noise ratio is adequate.

A typical memory unit may have a capacity of 1024 words, each 24 bits (binary digits) in length. The memory elements in each of the 24 planes may be deposited in four 16×16 element submatrices making up a 32×32 element plane. The elements may be 0.4 centimeter diameter and about 0.8 centimeter center spacing, on about 30 mil thick glass plates about five inches square. In this case, the printed circuits for the different windings may be made in subsections for a given layer to cooperate with said submatrices, and each subsection may be similar to the windings illustrated in connection with FIGURE 11. In production, the core elements for a whole plane may be evaporated at one time, while the subsections for the different planes of windings may be etched or otherwise produced simultaneously.

In a 24 plane memory, the inductance of an isolated drive line is 2 to 3 microhenries although, because of laminated etched wiring construction, the individual drive lines appear as impedance transmission lines with characteristic impedances of 10 to 15 ohms.

By way of example, these memories may provide cycle times of about two microseconds and access time of less than one microsecond. Cycle time is the time which must elapse between the initiation of two successive addresses of the same memory cell; access time is the delay between the beginning of an address and the time that a useful output signal is obtained. The memory operating cycle may be broken up into essentially three periods. A period of 0.6 microsecond is allowed for selection to take place. Two periods of about 0.7 microsecond are allowed for reading the information and then restoring. If the memory is to be interrogated every two microseconds, each "on" drive line or inhibit line requires an input of about 2.5 watts with most of the energy being expended in terminating resistors. If slower speed operation were satisfactory, power input to the inhibit or drive lines could be reduced to 1.3 watts by connecting in series two halves of the drive lines or inhibit lines which are driven in parallel in the faster arrangement.

In a crude experimental setup it is estimated that evaporated core elements can be produced for one cent apiece or less. With present production techniques, cost per bit element could be reduced to a few tenths or a few hundredths of a cent. Matrix wiring costs are estimated to be less than one cent per bit.

Reference to "transverse field" or the like, in this specification including the claims, is meant to include any field, even that produced by the earth if such can be used to advantage in a given situation. However, the earth's field normally will be difficult to use to advantage, and shielding may be desirable. To optimize shielding, it is necessary to adjust any remanent magnetization in the shield so that the resultant of the magnetic field and the earth's magnetic field contribution is a minimum within the shield. Such adjustment, termed "deperming," may be accomplished by gradually reducing alternating current in a winding about the shield from about 100 amperes to 0. Such a procedure reduces the earth's magnetic field to less than one-tenth its unshielded magnitude.

Although not herein shown, it is to be understood that the longitudinal and transverse magnetic fields can be produced by use of conventional coils and straight or bent round conductors as well as the flat conductors illustrated, all such field producing means being included in the terms "winding" or "winding means."

Any sandwich unit such as the memory unit of FIGURE 11 or the single element unit of FIGURE 8, may be built up not only by prefabricating the different layers and cementing same together, but also by depositing the several layers in a continuous vacuum condensation technique. For example, in a manner similar to that described in the above mentioned Rubens application, there could be an evacuated space having three crucibles, one for magnetic material, another for non-magnetic conducting material, and a third for dielectric material, and means for evaporating and condensing the materials in the crucibles successively onto an original substrate in cooperation with successive masks, operable into desired position in any practical manner, to provide the desired sandwich. That is, by different masks respectively movable over a predetermined area of the original substrate, and separate shutter devices near the crucibles for covering the crucibles when evaporation therefrom is not desired, the magnetic material could be deposited first, followed by a deposition of dielectric material overall, then deposition of the sense windings in predetermined form, then dielectric deposition overall, etc. Such a method for making sandwiches may include the use of a transverse winding, or alternatively, the magnetic films may be deposited in a magnetic field at such an angle that the resultant easy axis of magnetization is rotated relative to the field which would be produced by current in the drive windings so that the transverse field is provided in the manner hereinbefore described with reference to FIGURE 5.

Thus it is apparent that there is provided by this invention systems in which the various phases, objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. An information storage element comprising a thin film of magnetic material having uniaxial anisotropy causing an effective single easy magnetization axis in the plane of said film, said film being capable of assuming stable remanence conditions along said axis representative of two binary states, energizing means inductively coupled to said element for generating a magnetic field in one of said directions of magnetization in accordance with signals applied thereto, the magnitude of said field being less than the normal switching threshold of said material, and means for generating a magnetic field having a component transverse to said axis of magnetization whereby the excitation threshold of said magnetic element is reduced sufficiently to permit switching by conjoint operation of said energizing means and said means for generating a transverse field.

2. A magnetic element comprising a film of magnetic material having in its plane an effective single easy axis along which the magnetization of said material may rest in either of two different remanent directions, the magnetization of said material being normally switchable between said directions by a magnetic field applied antiparallel to the instantly existing one of said directions if the said field exceeds the normal switching threshold of said material as that threshold exists when only said field is applied, means for applying to said material a predetermined field antiparallel to the instant one of said directions, and means for reducing said switching threshold to cause said material in switching to the other of said directions to experience a switching threshold at an amplitude of the said predetermined field less than the magnitude of said normal switching threshold, the amplitude of the said predetermined field being at least as great as the amplitude of said reduced switching threshold.

3. A magnetic element as in claim 2 wherein the last mentioned means includes means for applying concurrently with the said predetermined field another field which is transverse to both of said directions.

4. A magnetic element as in claim 2 wherein the said predetermined field is at all times less in amplitude than the said normal switching threshold.

References Cited in the file of this patent

UNITED STATES PATENTS

| | | |
|---|---|---|
| 2,700,150 | Wales | Jan. 18, 1955 |
| 2,724,103 | Ashenhurst | Nov. 15, 1955 |
| 2,743,507 | Kornei | May 1, 1956 |
| 2,746,130 | Davis | May 22, 1956 |
| 2,792,563 | Rajchman | May 14, 1957 |
| 2,825,891 | Duinker | Mar. 4, 1958 |

OTHER REFERENCES

Buck et al.: Nondestructive Sensing of Magnetic Cores, "Communications and Electronics," published January 1954, pp. 822–830.

M. S. Blois: "Preparation of Thin Magnetic Flms and Their Properties," Journal of Applied Physics, vol. 26, No. 8, August 1955, pp. 975–980.